United States Patent [19]

Stone

[11] Patent Number: 5,314,940

[45] Date of Patent: May 24, 1994

[54] HIGH WET-FRICTION ELASTOMERIC COATINGS INCLUDING A THERMOPLASTIC RUBBER AND PETROLATUM

[76] Inventor: Donald D. Stone, P.O. Box 1197, Ocean City, Md. 21842

[21] Appl. No.: 902,595

[22] Filed: Jun. 22, 1992

[51] Int. Cl.$^5$ .......................... C08J 5/14; C08L 53/00
[52] U.S. Cl. .................................. 524/271; 524/275; 524/490; 524/505; 523/149; 523/150
[58] Field of Search ............... 524/490, 275, 505, 271; 523/149, 150

[56] References Cited

U.S. PATENT DOCUMENTS

| | | | |
|---|---|---|---|
| 2,906,720 | 9/1959 | Simpson | 260/28 |
| 4,536,454 | 8/1985 | Haasl | 428/516 |
| 4,745,139 | 5/1988 | Haasl et al. | 523/149 |
| 4,946,503 | 8/1990 | Hattori et al. | 106/14.34 |
| 4,990,184 | 2/1991 | Dotson et al. | 106/14.11 |

*Primary Examiner*—Paul R. Michl
*Assistant Examiner*—U. K. Rajguru
*Attorney, Agent, or Firm*—Melvin Blecher

[57] ABSTRACT

Disclosed are high wet-friction, highly adherent, non-abrasive elastomeric compositions producing smooth, slip-resistant coatings on surfaces, containing as primary components a thermoplastic rubber block copolymer and a petrolatum, and optionally independently including a plasticizer such as a hydrogenated polybutene, a tackifier such as polyisobutylene or a hydrocarbon resin, an antioxidant or a UV light absorber, in a carrier organic solvent, and containing no abrasive filler or particulate additives.

11 Claims, No Drawings

HIGH WET-FRICTION ELASTOMERIC COATINGS INCLUDING A THERMOPLASTIC RUBBER AND PETROLATUM

BACKGROUND OF THE INVENTION

1. Field of the Invention

The invention relates generally to modified thermoplastic rubber formulations useful as coatings in wet use environments and particularly to such coatings useful as high wet friction coatings on surfboards, bathtubs, shower stalls, boat decking and the like.

2. Description of the Prior Art

Literally hundreds of use environments exist wherein safety or other considerations are improved by the availability of a surface coating which provides improved friction when the surface is wetted. A typical application is for the deck of a surfboard and on surfaces of similar equipment including wind surfing watercraft, bodyboards, and certain surfaces of jet skiis including the rubber pads which are normally intended to contact a user's feet. Other sporting equipment such as gloves, diving boards, hand rails and ladders used around swimming pools as well as boat decks and docks would have improved performance by the availability of an anti-slip coating which is effective when wetted by water and particularly over a relatively wide range of temperatures. Other surfaces which typically become slippery when wetted with water include shoe soles, surgical gloves, automobile tires, bathtub surfaces and shower stall surfaces, particularly shower stall floors, bathroom floors, conveyor belts handling wet products, there being a substantial need over a very wide range of applications for coatings which exhibit substantial traction or friction when said surfaces are wetted by water.

In the prior art, it has generally been necessary to provide enhanced friction in coatings on surfaces as described above by the provision in such a coating of a filler material such a silicon dioxide, high-strength glass microspheres, or other filler materials which provide increased surface roughness and therefore increase the overall anti-slip characteristics of such coatings. However, the prior art coatings having at least some degree of anti-slip properties and which include fillers and materials for increasing the roughness of the surface coating are inadequate in many situations due to the fact that the abrasiveness imparted by the fillers is unacceptable when such coatings must contact human skin. For example, U.S. Pat. No. 4,745,139 to Haasl et al provides surface coating formulations which are intended to improve traction on a surface which is frequently contacted with water, the disclosed coatings being provided with fillers including particulate colloidal or powdered silicon dioxide and/or glass microspheres. When a coating according to Haasl et al is applied to the deck of a surfboard, for example, the roughened coating irritates and abrades the skin of a user, especially when a user lies prone on the surfboard as when paddling the board out to catch a wave. The present coating formulations provide increased frictional and anti-slip surface characteristics without incorporation of fillers to roughen the surfaces of the coatings. The present coating formulations thus are useful in at least those applications delineated by Haasl et al in U.S. Pat. No. 4,745,139 and further provide the advantage of being unabrasive to the skin of a user.

Haasl et al, in U.S. Pat. No. 4,745,139, and Haasl in U.S. Pat. No. 4,536,454, provide thermoplastic rubber formulations which are compounded with styrene/ethylene/butylene/styrene block copolymers. The thermoplastic rubber formulations provided in these patents derive increased anti-slip characteristics by virtue of fillers included in the thermoplastic rubber formulations and which fillers act to roughen the surfaces of coatings formed from said formulations. The formulations of Haasl and Haasl et al do not provide relatively soft surfaces for their coatings which are non-abrasive to human skin and which can contact human skin with a high degree of comfort. The present invention improves the anti-slip coating formulations of Haasl and Haasl et al at least by the provision of petrolatum in thermoplastic rubber formulations, this additional material providing in thermoplastic rubber formulations a surface coating having high anti-slip properties when wet and which also is compatible with contact with the skin of a user of the coating, the coating formulations also adhering reliably to surfaces such as the decks of surfboards, etc. and which also have high tensile strengths.

Dotson et al, in U.S. Pat. No. 4,990,184, provides coating compositions containing petrolatum and polymerizable materials used to form corrosion resistant coatings. However, Dotson et al do not provide coatings which have anti-slip properties when wet. The polymers used by Dotson et al include linear polyethylene polymers having terminal carboxylic acid groups, polybutenes and amorphous polypropylenes. Accordingly, the coatings of Dotson et al, even though including a petrolatum material, would not lead a person of ordinary skill in the art to the compounding of thermoplastic rubbers with petrolatum to provide a film or coating having increased traction when wet. The present invention thus provides a substantial advance in the art relative to the compounding of thermoplastic rubbers with petrolatum to provide a surface coating for the surface of a surfboard or the like whereby the surface coating is adherent to the surface of the surfboard and which provides traction or friction improvement when wet and which is also agreeable to skin touch.

SUMMARY OF THE INVENTION

The invention provides compositions of matter primarily comprising thermoplastic rubbers compounded with petrolatums to produce coatings exhibiting high friction when wet and being adherent to surfaces such as the decking of a surfboard, body board or other watercraft including the decking of boats. In the present thermoplastic rubber/petrolatum formulations, a polybutene is admixed in the formulations to apparently act not only as a plasticizer but also as a material which binds with the thermoplastic rubbers and thus to function as more than simply a plasticizer in the formulations. The provision of a petrolatum in the thermoplastic rubber formulations of the invention acts to increase wet friction as well as to reduce the durometer of the formulations. The resulting formulations are therefore nonabrasive to human skin yet provide a very substantial degree of wet friction without the need for typical fillers such as silicon dioxide, glass microspheres, etc. which have previously been necessary to yield any substantial degree of traction for thermoplastic rubber formulations when coated on surfaces which typically become wetted with water when in use.

U.S. Pat. No. 4,536,454 to Haasl and U.S. Pat. No. 4,745,139 to Haasl et al, describe thermoplastic rubbers which are preferred according to the invention, the disclosure of these two patents being incorporated hereinto by reference. Preferred formulations of the invention utilize elastomeric thermoplastic rubbers which are tri-block copolymers having polystyrene end blocks and a rubbery poly(ethylene-butylene) midblock which are two-phase polymers consisting of hard polystyrene domains in a rubbery poly(ethylene-butylene) matrix. Thermoplastic rubbers useful according to the invention are produced by the Shell Chemical Company and marketed as KRATON G 1652. Preferred formulations according to the invention also comprise petrolatums available from the Sonneborn Division of Witco Corporation and marketed under the PROTOPET trademark. The present formulations further include a polybutene material such as is produced by the American Oil Company under the designation Polybutene H-300. These formulation components are admixed according to standard practices in the industry and can be further compounded with additional components including hydrocarbon resins, polyisobutylenes, antioxidants, solvents and the like to produce anti-slip coatings which exhibit substantial wet friction characteristics when wetted by water.

Accordingly, it is an object of the invention to provide high wet-friction elastomeric coatings useful on surfaces which are typically wetted by water when in use, these coatings exhibiting high friction when wet without the need for abrasive fillers which are incompatible with contact by human skin.

It is another object of the invention to provide high wet-friction elastomeric coatings compounded of thermoplastic rubbers, petrolatums and polybutenes and which form high friction and highly adherent coatings on surfaces which are wetted by water when in typical use situations, such surfaces including the decking of surfboards and other water sports equipment as well as the decking of boats, surfaces of bathtubs, floors of shower stalls, etc.

It is a further object of the invention to provide thermoplastic rubber formulations including petrolatum materials which increase the wet coefficient of friction of coatings formed from thermoplastic rubber formulations and which also produce coatings of reduced durometer.

Further objects and advantages of the invention will become more readily apparent in light of the following detailed description of the preferred embodiments.

DESCRIPTION OF THE PREFERRED EMBODIMENTS

The present high wet-friction elastomeric coatings are compounded from a group of materials known as thermoplastic rubbers with a petrolatum added to provide a non-skid wet surface to the thermoplastic rubbers and to reduce the durometer of the rubber. The quantity of the petrolatum added to the thermoplastic rubber is controlled such that tensile strength is maintained at an acceptable level with adhesion to a substrate also being maintained at an acceptable level. Polybutene material is typically employed according to the preferred embodiments of the invention for improvement of tensile strength of the thermoplastic rubber/petrolatum compositions. Further, the addition of a polybutene material assists in controlling surface tack when wet, assists in reducing durometer and further improves adhesion to substrates. Preferred thermoplastic rubber materials include elastomeric styrene/ethylene/butylene/styrene block copolymers either used alone or in association with methylmethacrylate copolymer materials. Preferred thermoplastic rubbers are tri-block copolymers having polystyrene end blocks and a rubbery poly(ethylene-butylene) mid block which are two-phase polymers consisting of hard polystyrene domains in a rubbery poly(ethylene-butylene) matrix. The preferred thermoplastic rubber material thus described comprises a material produced by the Shell Chemical Company under the trademark KRATON G 1652, this material being described in Technical Bulletin SC:39-85 published by the Shell Chemical Company, this Technical Bulletin being incorporated hereinto by reference. Thermoplastic rubbers also suitable according to the invention include those thermoplastic rubbers described in U.S. Pat. Nos. 4,536,454 to Haasl and 4,745,139 to Haasl et al, the disclosures of these patents being incorporated hereinto by reference. It is to be understood from the foregoing documents which are incorporated hereinto by reference that the formulations of thermoplastic resins so described can include materials such as tackifiers, antioxidants, solvents, etc.

To a thermoplastic rubber or rubbers such as is described above according to the present formulations, a petrolatum material is admixed into the formulation, preferred petrolatums being produced by the Sonneborn Division of Witco Corporation, 520 Madison Avenue, New York, N.Y., under the trademark PROTOPET petrolatums. A particularly useful petrolatum material is marketed by Sonneborn as PROTOPET White 1S. This petrolatum material is a USP grade having a melting point of 54/C°, a consistency of 180/210, a Saybolt viscosity at 210° F. of 60/80 and a Centistoke viscosity at 100° C. of 10/16. The petrolatum material is a white color. While the PROTOPET petrolatum White 1S is preferred in the present formulations, it is to be understood that other petrolatums including petrolatums available from Sonneborn/Witco and marketed as PROTOPET petrolatums, PERFECTA petrolatum and FONOLINE petrolatums are also useful, the PERFECTA and FONOLINE being trademarks of the Sonneborn Division of Witco Corporation. In general, Sonneborn petrolatums are homogeneous, semi-solid mixtures of oily and waxy hydrocarbons characterized by viscosity, sheer strength, chemical and biological inertness and non-polar hydrocarbon properties. While petrolatum materials have previously been compounded with polymeric materials including rubbers, such as in the forming of molded articles, petrolatum materials have not heretofore been compounded with thermoplastic rubbers or any other polymers to produce formulations capable of forming coatings which exhibit high friction when wet and lack of abrasiveness to human skin while retaining the desired tensile strength and ability to adhere to substrates such as the decking of surfboards, etc.

While the necessary components of the present formulations comprise the thermoplastic rubber material and the petrolatum material, preferred formulations also include a hydrogenated polybutene such as is manufactured by the Amoco Chemical Company of Chicago, Ill. under the designation H-300. This material has a Saybolt Universal viscosity, ASTM D2161, at 38° C., SUS of 140,000 and a molecular weight of approximately 1290. The polybutene material effectively acts as a plasticizer, the polybutene material apparently becoming an integral part of the thermoplastic rubber polymer in that the polybutene resists extraction and degradation. In the present formulations, the polybutene material acts to improve tensile strength of the thermoplastic rubber material/petrolatum material combination. Further, the polybutene material acts to control surface tack when wet, reduces durometer and improves substrate adhesion capabilities.

Formulations according to the invention can be compounded from a material which is commercially available under the trademark PLASTI DIP, P.D.I. Incorporated of Blaine, Minn. The PLASTI DIP material includes thermoplastic rubbers such as KRATON 1652 along with solvents, plasticizers, etc. including 1,1,1-trichloroethane, VM&P naphtha, toluene, heptane and materials such as antioxidants, etc. An admixture of 100 parts by weight of PLASTI DIP, 30 parts by weight of polybutene H-300, and 30 parts by weight of petrolatum PROTOPET 1S, produces a formulation which when admixed as is conventional in the art and applied to the decking of a surfboard, for example, produces a coating having excellent wet traction, good substrate adhesion, lack of abrasiveness to the skin and good tensile strength. Substitution of the polybutene H-300 with polybutene H-1500, also a material available from the Amoco Chemical Company, produces a formulation having acceptable properties.

Other formulations utilizing the PLASTI DIP material including the admixing of 12 parts by weight of PLASTI DIP with 3.4 parts by weight of SUPER SOFT PET petrolatum, a product produced by the Sonneborn Division of Witco Corporation, and being similar to the petrolatum PROTOPET 1S described above. To this PLASTI DIP/petrolatum mixture is incorporated 0.8 parts by weight of PANALANE polybutene, PANALANE being a trademark of the Amoco Chemical Corporation. To this formulation is added minor amounts of TINUVIN 327, TINUVIN 770, and IRGANOX, an antioxidant manufactured by the CIBA-GEIGY Corporation, IRGANOX being a trademark of CIBA-GEIGY. The TINUVIN materials and the IRGANOX are admixed with the formulation individually as 0.1 parts by weight.

Yet another formulation utilizing the thermoplastic rubber in the PLASTI DIP product includes 14 parts by weight of PLASTI DIP, 4.2 parts by weight of polybutene H-300 and 4.2 parts by weight of petrolatum PROTOPET 1S. Minor amounts to the extent of 0.1 parts by weight of each of TINUVIN 327, TINUVIN 770 and IRGANOX are added to the formulation to produce a high wet strength coating on the decking of a surfboard, the coating having acceptable adhesion to the substrate and tensile strength while being nonabrasive to the skin of a user. This formulation can include the polybutene H-300 material in a ratio of between 3 and 5 parts by weight.

Using KRATON G 1652 thermoplastic rubber as a starting point, approximately 12 to 24 parts by weight can be employed in a variety of formulations along with approximately 30 parts by weight each of petrolatum PROTOPET White 1S and polybutene H-300 to yield anti-slip coatings having useful properties. Conventional solvents and additives including toluene, n-propyl acetate, lactol spirits, heptane, etc. can be formulated with the thermoplastic rubber, petrolatum and polybutene. The solvents are present in quantities which are essentially each equal the parts by weight of the three active constituents or even twice the parts by weight thereof.

A particularly useful formulation includes the compounding of 24 parts by weight of KRATON G 1652 thermoplastic rubber with petrolatum PROTOPET 1S, 30 parts by weight and polybutene H-300, 30 parts by weight. The formulation can further include 84 parts by weight of toluene, 84 parts by weight of n-propyl acetate, 168 parts by weight of lactol spirits, and 20 parts by weight each of REGALREZ hydrocarbon resins, REGALREZ being a registered trademark of Hercules, Incorporated, Wilmington, Del., and preferably being the product commercially available as REGALREZ 1126. The REGALREZ 1126 improves the formulation by increasing substrate adhesion. Still further, the composition can include 20 parts by weight of VISTANEX LM-MS, a polyisobutylene which increases substrate adhesion and provides additional flexibility and toughness to a coating formed from the formulation.

Additional formulations according to the invention vary from 12 to 24 parts by weight of KRATON G 1652, 25 to 35 parts by weight of petrolatum PROTOPET WHITE 1S, 20 to 35 parts by weight of polybutene H-300, 70 to 100 parts by weight of toluene, 70 to 100 parts by weight of n-propyl acetate, 150 to 200 parts by weight of lactol spirits, 0 to 30 parts by weight of REGALREZ 1126, 0 to 60 parts by weight of VISTANEX LM-MS, these materials being compounded according to conventional mixing practices.

Accordingly, the present formulations produce coatings on surfaces typically wetted by water whereby the coatings exhibit high frictional characteristics when wet to allow traction to be gained by a user even when human skin contacts the coatings. The present formulations and coatings produced therefrom are thus useful in applications ranging from surfboard decks to bathtub surfaces, shower stall surfaces, etc. In light of the foregoing, the invention is seen to be useful in a variety of applications and according to a variety of formulations, the invention thus being limited by the recitations of the following claims.

What is claimed is:

1. A composition producing high wet-friction, highly adherent, slip resistant surfaces to which said composition is applied comprising a homogeneous mixture of:
   a thermoplastic rubber block copolymer;
   a slip resistant effective amount of a petrolatum; and, optionally independently,
   an effective amount of a plasticizer or a tackifier, dissolved in an organic solvent carrier, without abrasive fillers.

2. A composition of claim 1 wherein said copolymer comprises a styrene/ethylene/butylene/styrene triblock copolymer.

3. A composition of claim 1, wherein said optional plasticizer is a polybutene.

4. A composition of claim 1, wherein said optional tackifier is a polyisobutylene or a hydrocarbon resin.

5. A composition of claim 1, wherein said organic solvent comprises a mixture of one or more solvents selected from the group consisting of toluene, n-propyl acetate, lactol spirits, 1,1,1-trichloroethane, VM&P naphtha, and lower alkanes.

6. A composition of claim 1 wherein said block copolymer, said petrolatum and said optional plasticizer are present in amounts of about 12-24, about 25-35, and about 20-35 parts by weight, respectively.

7. A composition of claim 6, wherein said organic solvent comprises a mixture consisting essentially of toluene, n-propyl acetate and lactol spirits, each as a part by weight about equal to or greater than the sum total of the parts by weight of said block copolymer, said petrolatum, and said optional polybutene.

8. A composition of claim 1, further comprising a wet friction increasing effective amount of a methylmethacrylate copolymer.

9. A composition of claim 6, further comprising one or more materials selected from the group consisting of a 0–20 parts by weight of a tackifier hydrocarbon resin, 0–60 parts by weight of a tackifier polyisobutylene, 0–1 part by weight of an antioxidant, and 0–1 part by weight of an ultraviolet light absorber.

10. A composition comprising a homogeneous mixture of about 10–24 parts by weight of a styrene/ethylene/butylene/styrene tri-block copolymer, about 25–35 parts by weight of a petrolatum, about 20–35 parts by weight of a polybutene plasticizer, about 70–100 parts by weight of toluene, about 70–100 parts by weight of n-propyl acetate, about 150–200 parts by weight of lactol spirits, 0–30 parts by weight of a hydrocarbon resin tackifier, 0–60 parts by weight of a polyisobutylene tackifier, 0–1 part by weight of an antioxidant, and 0–1 part by weight of an ultraviolet light absorber, and without abrasive fillers.

11. A solid surface coated with a composition of claim 1.

* * * * *